United States Patent [19]

Swidler et al.

[11] 3,849,116

[45] Nov. 19, 1974

[54] BORON BINDING PLANT GROWTH AGENTS

[75] Inventors: Ronald Swidler; Harris M. Benedict, both of Pasadena, Calif.

[73] Assignee: Stanford Research Institute, Menlo Park, Calif.

[22] Filed: July 23, 1971

[21] Appl. No.: 165,750

[52] U.S. Cl. ............................ 71/76, 47/1.2, 71/66, 71/121
[51] Int. Cl. ...................................................... A01n
[58] Field of Search ................................ 71/121, 76

[56] References Cited
UNITED STATES PATENTS

| | | | |
|---|---|---|---|
| 3,047,609 | 7/1962 | Swidler | 260/462 R |
| 3,181,942 | 5/1965 | Popoff | 71/121 |
| 3,271,435 | 9/1966 | Randall et al | 71/121 |

Primary Examiner—James O. Thomas, Jr.
Attorney, Agent, or Firm—Lindenberg, Freilich, Wasserman, Rosen & Fernandez

[57] ABSTRACT

Herbicidal compositions including a benzazaboroxane precursor such as an aryl substituted N,N'-bis-(hydroxyalkyl)-2-hydroxybenzylamine compound are disclosed. Increased herbicidal activity is observed with increasing oil solubility of the compound. Activity appears to proceed by binding or mining boron from the plant due to the ligand action of the compounds in forming benzazaboroxanes.

7 Claims, No Drawings

BORON BINDING PLANT GROWTH AGENTS

BACKGROUND OF THE INVENTION

1. Field of the Invention

The present invention relates to plant growth control and more particularly, to boron binding plant growth controlling agents.

2. Description of the Prior Art

It is known that the presence of boron at low levels is essential for metabolism and normal growth of certain plants and that at higher levels boron is toxic to these plants. Chelating agents have been added to high boron content irrigation water to bind the boron and reduce the toxic action on plants. However, these agents have not been found to be very effective in rendering boron nontoxic to sensitive agricultural crops.

A class of exceptionally water stable organic borate esters are disclosed in U.S. Pat. No. 3,047,609. Simple alkyl borates or aryl borates spontaneously hydrolyze in water. However, the benzazaboroxane esters disclosed in the cited patent can be formed directly from the addends by reaction in aqueous media.

SUMMARY OF THE INVENTION

The present invention relates to the use of precursors of these borate esters as plant growth controlling agents. The precursors are compounds of the formulae:

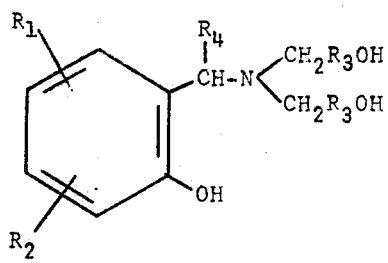

(I)

and

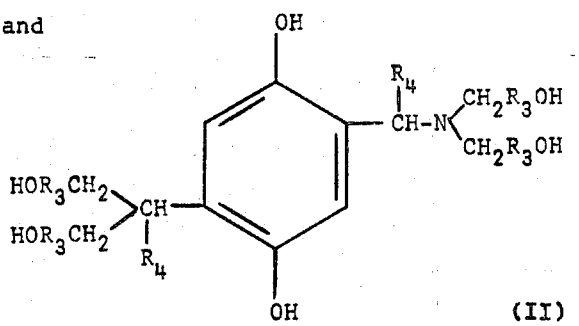

(II)

where $R_4$ is hydrogen or lower alkyl of 1–10 carbon atoms; $R_3$ is methylene, ethylene or a

group, $R_1$ is hydrogen, hydroxyl or alkyl, and $R_2$ is hydrogen, hydroxyl, halogen, an alkyl group, aryl, haloaryl, alkoxy, haloalkyl, carboxyl, a p-hydroxydimethylbenzyl group and $R_1$ and $R_2$ when joined together and taken with the benzene from a naphthalene group. The aryl groups may be selected from phenyl, biphenyl, tolyl and xylyl. Useful halogens include chlorine, bromine or iodine. The $R_1$ and $R_2$ alkyl groups preferably contain at least 6 and usually not more than 20 carbon atoms.

The precursors are conveniently prepared by solvolysis of the corresponding benzazaboroxane of the formulae:

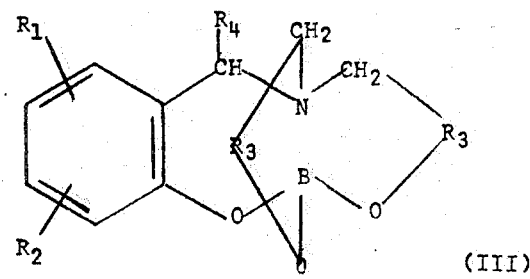

(III)

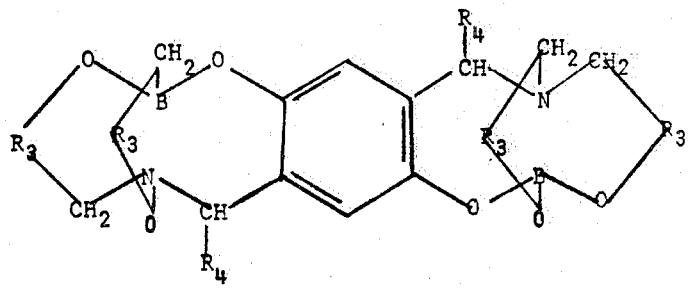

where $R_1$, $R_2$, $R_3$ and $R_4$ have the previously defined meanings. A series of N,N'-bis-(β-hydroxyethyl)-2-hydroxybenzylamine ligands were prepared from 3-substituted-benz-(7,8)-1-aza-5-boro-4,6,13-trioxabicyclo-(4,3,3)-dodecanes according to the following procedure. The dodecanes were synthesized via a modified Mannich reaction as described in U.S. Pat. No. 3,047,609, the disclosure of which is incorporated herein by reference.

EXAMPLE 1

A suspension of about 1.5 mol of the benzazaboroxane in 500 cc of methanol was saturated with dry hydrogen chloride whereupon the benzazaboroxane dissolved. The solution was placed on a steam bath and the methanolmethyl borate azeotrope (bp 54.6°C, 75.5% methyl borate) was removed by distillation. The residual methanol was removed in vacuo and the crystalline residue was recrystallized from isopropanol or ethanol. After the second recrystallization white powdery crystals were obtained. The precursor compounds have the following structural formula:

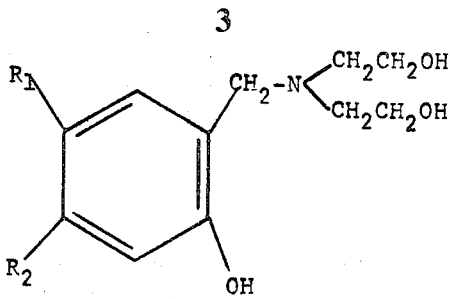

The characteristics of the 5-R-substituted-N,N'-bis-(β-hydroxyethyl)-2-hydroxybenzylamine hydrochlorides are provided in the following table.

TABLE 1

| No. | $R_1$ | $R_2$ | Shortened Name | Melting Point °C | pK* | NE** | MW | Borate Ester Melting Point °C |
|---|---|---|---|---|---|---|---|---|
| 1 | H | H | Basic | | | | 246.6 | 224–5 |
| 2 | Carboxy | H | Carboxy | 172–3 | 5.6 | 275.5 | 275.5 | 328 |
| 3 | Chloro | H | Chloro | 142.6 | 6.2 | 269.1 | 269.1 | 240–1 |
| 4 | Naphtha | (R1+R2) | Naphtha | 127–32 | 6.4 | 305 | 297.8 | 297–8 |
| 5 | t-Butyl | H | Butyl | 157–60 | 6.5 | 272.3 | 303.8 | 297–8 |
| 6 | Biphenyl | H | Biphenyl | | | | | |
| 7 | Isooctyl | octyl | H | 146–7 | 6.6 | 347.0 | 359.9 | 204–6 |

The borate esters readily reform directly from the addends by reaction in aqueous media. Experiments have demonstrated that the reaction proceeds at low concentration (equivalent to 10 ppm B) to an equilibrium state containing up to 90% of the tryptych structured benzazaboroxane esters.

To ascertain the biological activity of the boron binding ligands of the invention, five replications of Black Valentine bean plants were grown in water culture consisting of complete nutrient solutions absent boron and containing 10 ppm excess boron as sodium borate. The ligands were added to the nutrient solution in an amount equivalent to 10 ppm of boron. Additionally, a control solution absent a ligand was prepared and a solution containing triisopropylamine (TIPA) a known boron binding chelate was prepared. The results of the dry weight determinations are described in the following table.

TABLE 2

| DRY WEIGHT-GRAMS PLANT PART AND CHELATING AGENT | NO EXCESS BORON | 10 PPM EXCESS BORON | BORON CONTENT mg/kg NO EXCESS BORON | 10 PPM EXCESS BORON |
|---|---|---|---|---|
| Tops | | | | |
| None | 5.40 | 2.12 | 10 | 308 |
| TIPA | 5.68 | 3.26 | 10 | 235 |
| Carboxy | 6.18 | 3.00 | 8 | 213 |
| Chloro | 4.75 | 2.58 | 11 | 303 |
| Naphtha | 0.76 | .16 | 16 | 580 |
| Butyl | 3.75 | 2.58 | 12 | 288 |
| Bi Phenyl | 0.74 | .60 | 14 | 455 |
| Octyl | Died | Died | | |
| Roots | | | | |
| None | .50 | .22 | 24 | 186 |
| TIPA | .60 | .40 | 21 | 102 |
| Carboxy | .96 | .48 | 14 | 129 |
| Chloro | .64 | .50 | 14 | 180 |
| Naphtha | .44 | .12 | 18 | 57 |
| Butyl | .76 | .66 | 12 | 162 |
| Bi Phenyl | .16 | .32 | 11 | 67 |
| Octyl | Died | Died | | |

In the absence of excess boron, the TIPA chelating agent and the carboxy substituted ligand compound did not exhibit phytotoxicity. No injury to the plant was noted and possibly some increase in growth was evidenced. The chloro- and the lower alkyl butyl substituted ligands depress the dry weight of the plant somewhat to afford a low level of phytotoxicity. The ligand agents which had two benzene rings and the higher alkyl octyl substituted ligand compound were extremely toxic. Toxicity symptoms developed within 16 hours and within 2 days almost all the leaves had dropped off. These plants made little or no growth during the experimental period of 2½ months.

The plants growing in the solutions to which 10 ppm of boron alone was added developed typical boron toxicity symptoms in a few days. The addition of a chelating agent of ligand compound to the boron in the solution did not delay the appearance of the symptoms although the severity was less with some plants. This was reflected in the dry weight of the tops of the plants. Again, the TIPA chelating agent and the carboxy substituted ligand compound did not injure the plants but possibly stimulated increase in growth. The ligand compounds containing 2 benzene rings and the higher alkyl octyl substituted compounds were again extremely toxic in themselves.

The ligand agents do afford the plants some, but not complete protection against excess boron with the exception of naphtha and octyl. It is apparent that the ligand agents are effective plant growth regulating substances to reduce boron toxicity effects of plants in the presence of high boron irrigation sources. Selected ligands in normal low boron irrigation waters and soils are effective as plant dwarfing or phytotoxic herbicidal agents.

When no born was present in the nutrient solution the boron contents of the plants did not differ significantly whether the chelating or ligand agents were present or not. In the presence of excess boron, boron toxicity symptoms on sensitive crops are reduced even though the plants take up an amount of boron 10 to 20 times that normally taken up. Therefore, boron appears to be uniquely unavailable to metabolizing the plants. It is also noted that the naphthyl, biphenyl and octyl ligands appear to induce the highest immobilization of boron into the plant substrates.

In order to further verify the biological action of the ligands, a group of the corresponding tryptych benzazaboroxane esters were selected for addition to a standard plant nutrient solution and vegetative response was observed in both sand and water culture. A control and an equivalent boron containing medium (boron as sodium borate) were included in the randomized screening experiments. Appropriate boron analysis was performed at intervals and at the termination of the experiments. The dry weights and boron contents of the Black Valentine bean plants are summarized in the following table.

TABLE 3

| Plant Boron Content of Nutrient Solution and Ligand Chelating Agent | Dry Weight Per Plant | | Boron Content Per Unit Weight Mg/Kg Dry Weight | |
|---|---|---|---|---|
| | Tops-Grams | Roots-Grams | Mg/Kg | Mg/Kg |
| Beans | | | | |
| Sodium Borate | 0.80 | 0.38 | 115 | 40 |
| Basic Ester | 2.92 | 1.18 | 285 | 82 |
| Carboxy Ester | 3.14 | .88 | 61 | 55 |
| Control-No excess boron[1] | 3.78 | 1.24 | 12 | 5 |
| L.S.D.[2] | .73 | .30 | | |

[1] The control solution contained 0.1 ppm of boron to supply boron requirements, other solutions, therefore, contained 10.1 ppm.
[2] L.S.D. = Least Significant Difference Though lethal quantities of boron appeared in all the plants exposed to the borate esters, there was only a very moderate dimmunition in plant vigor as compared to the control whereas sodium borate at the same level of boron was extremely toxic to the plants.

Since the preformed borate ester is not toxic to the plant, whereas the ligand when administered alone to the plant exhibits a high level of phytotoxicity it is believed that the biological action is due to the ligand binding boron from the plant and inducing a severe boron deficiency in the plant. Thus, the ligands can be applied to the plant at lower concentrations to induce minor element deficiencies as a useful dwarfing agent or at higher concentration levels as a phytotoxic herbicide.

On the basis of melting point and other theoretical considerations and an estimation of the partition coefficient of selected ligands, it was postulated that phytotoxic action would be more apparent for those compounds exhibiting a highly favorable oil-to-water solubility. The more likely it appeared that the borate water would tend to partition into an organic solvent or oil phase, the more toxic the compounds.

It was determined that the ratio of concentrations of the basic compound in an organic solvent over water was 0.23 but the ratio of concentration of the borate ester was over 200 probably between 500 and 1000. Therefore, phytotoxic herbicidal compositions in accordance with the invention preferably include a ligand compound in which either $R_1$ or $R_2$ is a substituent that provides an oil partition coefficient of at least 0.23, suitably being selected from naphtha, phenyl or higher alkyl containing 6 to 20 carbon atoms.

The higher toxic action of the more oil soluble compounds is further biologically interesting since these materials were supplied to the plants from aqueous medium. Therefore, consideration of translocation through the waxy epidermal leaf layers does not seem germane. Moreover, since substitution of the benzene ring in these ligands does not effect their base strengths appreciably, it can be concluded that the boron binding ability remains relatively unchanged. This again amplifies the role of partition in the biological action. Finally, it is interesting that the more oil soluble ligands, naphtha, phenyl and octyl, appear to induce the highest immobilization of boron into the plant substrate. If it is assumed that transference of the boron proceeds through reaction into an oil-phase in the plant, one might expect a shift in the equilibrium boron content vis-a-vis nutrient medium, plant aqueous sap and plant lipid regions.

The phytotoxic N,N'-bis-(hydroxyalkyl)-2-hydroxybenzylamine agents according to the invention can be applied to the nutrient or irrigation water for the plant, or can be applied directly to the plant as an aqueous spray solution or in a dry powdered form mixed with various inert carriers. Under normal soil and irrigation conditions, where the boron content of the water is at a level of $10^{-1}$ ppm, a concentration of $10^{-5}$ mols per liter of the ligand agent is capable of plant growth control as a dwarfing agent. At a concentration of at least $10^{-3}$ mols per liter, the ligand agents exhibit phytotoxic action. The concentration should be increased for high boron containing soils or irrigation waters.

It is to be understood that only preferred embodiments of the invention have been described and that numerous substitutions, modifications and alterations are all permissible without departing from the spirit and scope of the invention as defined in the following claims.

What is claimed is:

1. A method of dwarfing the growth of plants comprising the step of applying to the plants an effective amount of a compound of the formulae:

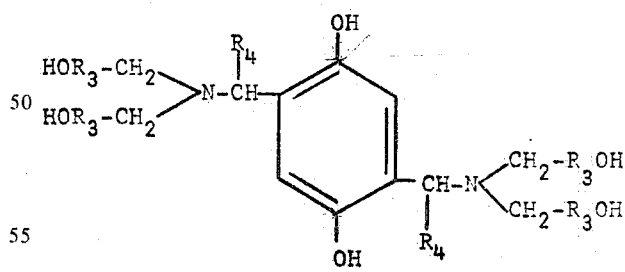

and

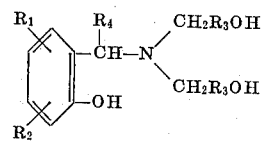

where $R_4$ is selected from hydrogen and lower alkyl of 1 to 10 carbon atoms; $R_3$ is selected from methylene, ethylene and

$R_2$ is selected from hydrogen, hydroxyl, halogen, alkyl, aryl, haloaryl, alkoxy, haloalkyl, carboxyl and p-hydroxydimethylbenzyl; $R_1$ is selected from hydrogen, hydroxyl and alkyl and $R_1$ and $R_2$ when joined together and taken with the benzene ring form naphthalene.

2. A method according to claim 1 in which the compound is a N,N'-bis-($\beta$-hydroxylalkyl)-2-hydroxybenzylamine of formula I where at least one of $R_1$ and $R_2$ are selected from hydrogen, phenyl, naphthyl, alkyl of 6–20 carbon atoms and haloalkyl of 6–20 carbon atoms.

3. A method according to claim 2 in which $R_3$ is methylene.

4. A method according to claim 3 in which $R_2$ is octyl.

5. A method according to claim 1 in which the compound is applied to the plant as an aqueous solution.

6. A method according to claim 5 in which the solution is applied to the soil in which the plant is growing.

7. A method according to claim 6 in which the compound is present in the solution in an amount at least $10^{-3}$ molar.

* * * * *